US012602311B2

(12) United States Patent
Mun

(10) Patent No.: US 12,602,311 B2
(45) Date of Patent: Apr. 14, 2026

(54) METHOD, DEVICE, SYSTEM, AND COMPUTER PROGRAM FOR COVERAGE-GUIDED SOFTWARE FUZZING

(71) Applicant: SAMSUNG SDS CO., LTD., Seoul (KR)

(72) Inventor: Seokhyeon Mun, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 169 days.

(21) Appl. No.: 18/348,778

(22) Filed: Jul. 7, 2023

(65) Prior Publication Data

US 2024/0012742 A1     Jan. 11, 2024

(30) Foreign Application Priority Data

Jul. 7, 2022     (KR) ........................ 10-2022-0083972
Oct. 28, 2022     (KR) ........................ 10-2022-0141128

(51) Int. Cl.
*G06F 11/3668*          (2025.01)
*G06F 11/362*          (2025.01)

(52) U.S. Cl.
CPC ...... *G06F 11/3676* (2013.01); *G06F 11/3644* (2013.01); *G06F 11/3688* (2013.01); *G06F 11/3692* (2013.01)

(58) Field of Classification Search
None
See application file for complete search history.

(56) References Cited

U.S. PATENT DOCUMENTS

2020/0125343 A1* 4/2020 Kashani ................ G06F 8/4441
2023/0367704 A1* 11/2023 Soukup ............... G06F 11/3692

FOREIGN PATENT DOCUMENTS

KR     10-2022-0103375 A     7/2022

OTHER PUBLICATIONS

H. Nie, X. Zhou and J. Zhang, "Hybrid Way of Code Coverage Tracking in Fuzz," 2019 IEEE 10th International Conference on Software Engineering and Service Science (ICSESS), Beijing, China, 2019, pp. 424-427. (Year: 2019).*

(Continued)

*Primary Examiner* — Andrew M. Lyons
(74) *Attorney, Agent, or Firm* — NSIP Law

(57)          ABSTRACT

The present disclosure relates to coverage-guided software fuzzing. A method includes performing a coverage-guided fuzzing test by using an instrumentation code inserted into points of a program under test, the method including: calculating an executed coverage according to which the instrumentation code is executed while inputting a test input value into an execution of the program under test; calculating a dormant coverage indicating each point having instrumentation code that has not been executed within a range of a reference number of times of the points, wherein the reference numbers of times are determined with regard to the respective points while determining whether the instrumentation code has been executed by the execution of the program under test on the test input value; and updating the program under test by adding or removing the instrumentation code on the basis of the dormant.

16 Claims, 12 Drawing Sheets

(56) References Cited

OTHER PUBLICATIONS

S. Sargsyan, S. Kurmangaleev, J. Hakobyan, M. Mehrabyan, S. Asryan and H. Movsisyan, "Directed Fuzzing Based on Program Dynamic Instrumentation," 2019 International Conference on Engineering Technologies and Computer Science (EnT), Moscow, Russia, 2019, pp. 30-33. (Year: 2019).*
C. Zhang, W. Y. Dong and Y. Zhu Ren, "INSTRCR: Lightweight instrumentation optimization based on coverage-guided fuzz testing ," 2019 IEEE 2nd International Conference on Computer and Communication Engineering Technology (CCET), Beijing, China, 2019. (Year: 2019).*

* cited by examiner

FIG. 3

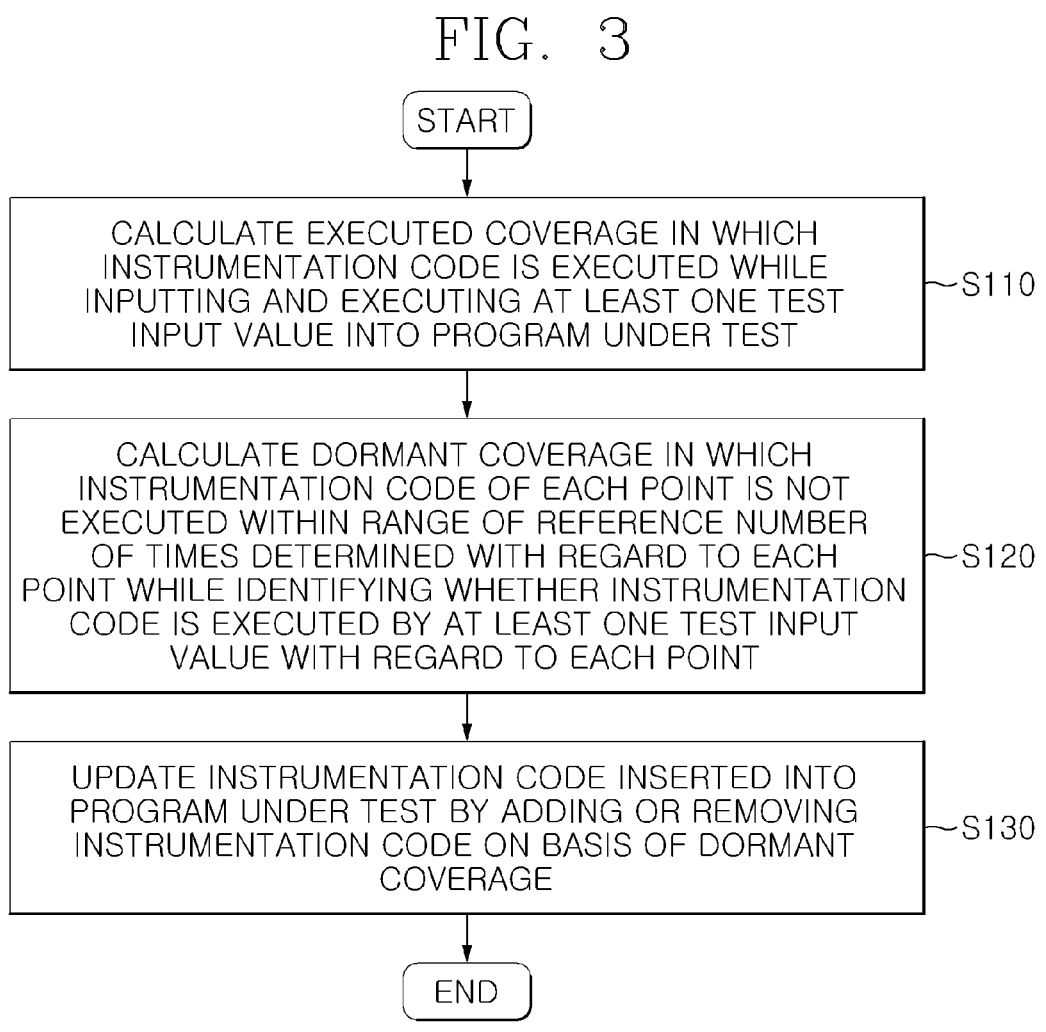

START

CALCULATE EXECUTED COVERAGE IN WHICH INSTRUMENTATION CODE IS EXECUTED WHILE INPUTTING AND EXECUTING AT LEAST ONE TEST INPUT VALUE INTO PROGRAM UNDER TEST ~S110

CALCULATE DORMANT COVERAGE IN WHICH INSTRUMENTATION CODE OF EACH POINT IS NOT EXECUTED WITHIN RANGE OF REFERENCE NUMBER OF TIMES DETERMINED WITH REGARD TO EACH POINT WHILE IDENTIFYING WHETHER INSTRUMENTATION CODE IS EXECUTED BY AT LEAST ONE TEST INPUT VALUE WITH REGARD TO EACH POINT ~S120

UPDATE INSTRUMENTATION CODE INSERTED INTO PROGRAM UNDER TEST BY ADDING OR REMOVING INSTRUMENTATION CODE ON BASIS OF DORMANT COVERAGE ~S130

END

FIG. 5

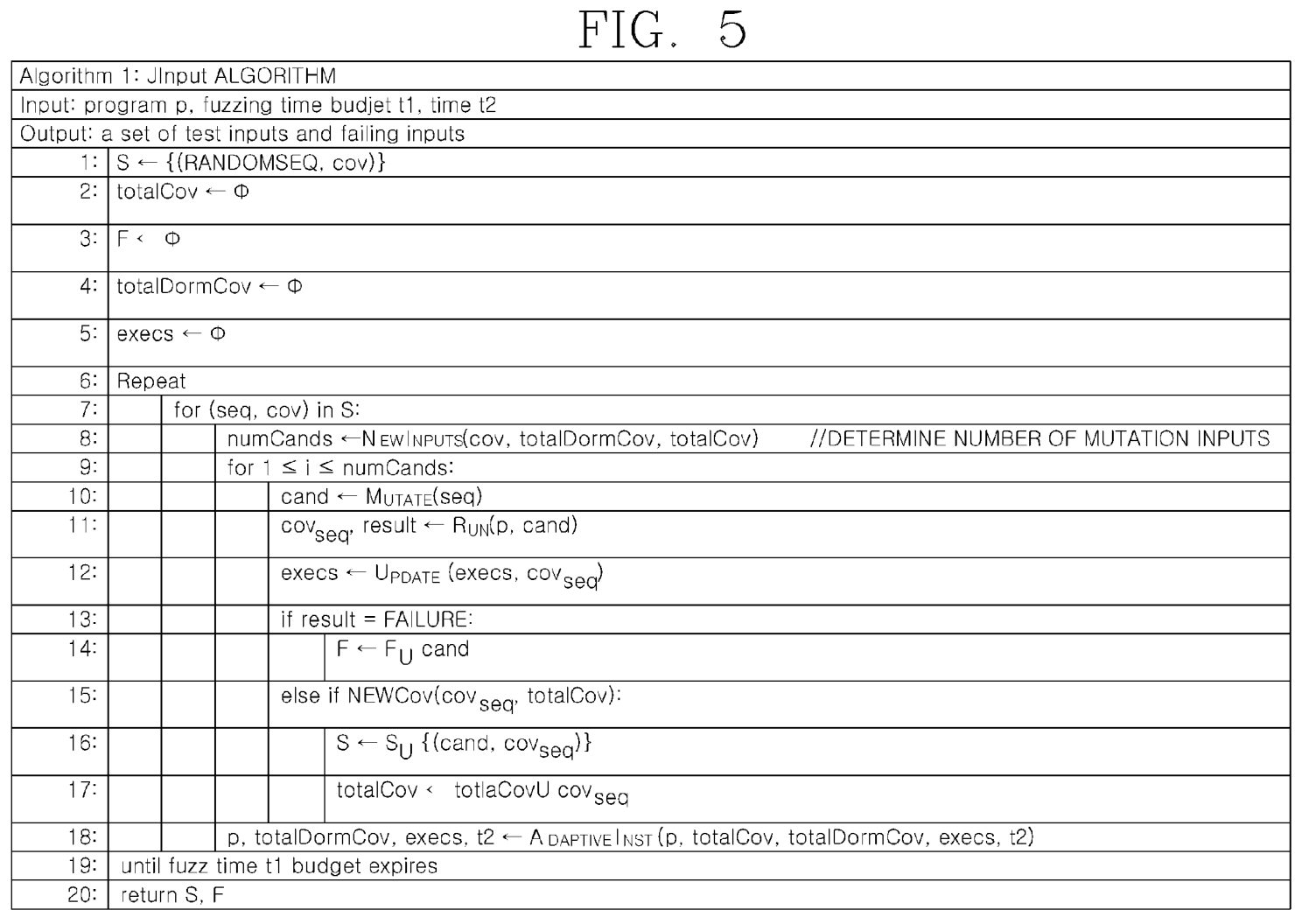

| | |
|---|---|
| | Algorithm 1: JInput ALGORITHM |
| | Input: program p, fuzzing time budjet t1, time t2 |
| | Output: a set of test inputs and failing inputs |
| 1: | S ← {(RANDOMSEQ, cov)} |
| 2: | totalCov ← φ |
| 3: | F ← φ |
| 4: | totalDormCov ← φ |
| 5: | execs ← φ |
| 6: | Repeat |
| 7: |    for (seq, cov) in S: |
| 8: |      numCands ← NEW INPUTS(cov, totalDormCov, totalCov)      //DETERMINE NUMBER OF MUTATION INPUTS |
| 9: |      for 1 ≤ i ≤ numCands: |
| 10: |        cand ← MUTATE(seq) |
| 11: |        $cov_{seq}$, result ← RUN(p, cand) |
| 12: |        execs ← UPDATE (execs, $cov_{seq}$) |
| 13: |        if result = FAILURE: |
| 14: |          F ← F ∪ cand |
| 15: |        else if NEWCov($cov_{seq}$, totalCov): |
| 16: |          S ← S ∪ {(cand, $cov_{seq}$)} |
| 17: |          totalCov ← totalCov ∪ $cov_{seq}$ |
| 18: |      p, totalDormCov, execs, t2 ← ADAPTIVE INST (p, totalCov, totalDormCov, execs, t2) |
| 19: | until fuzz time t1 budget expires |
| 20: | return S, F |

FIG. 6

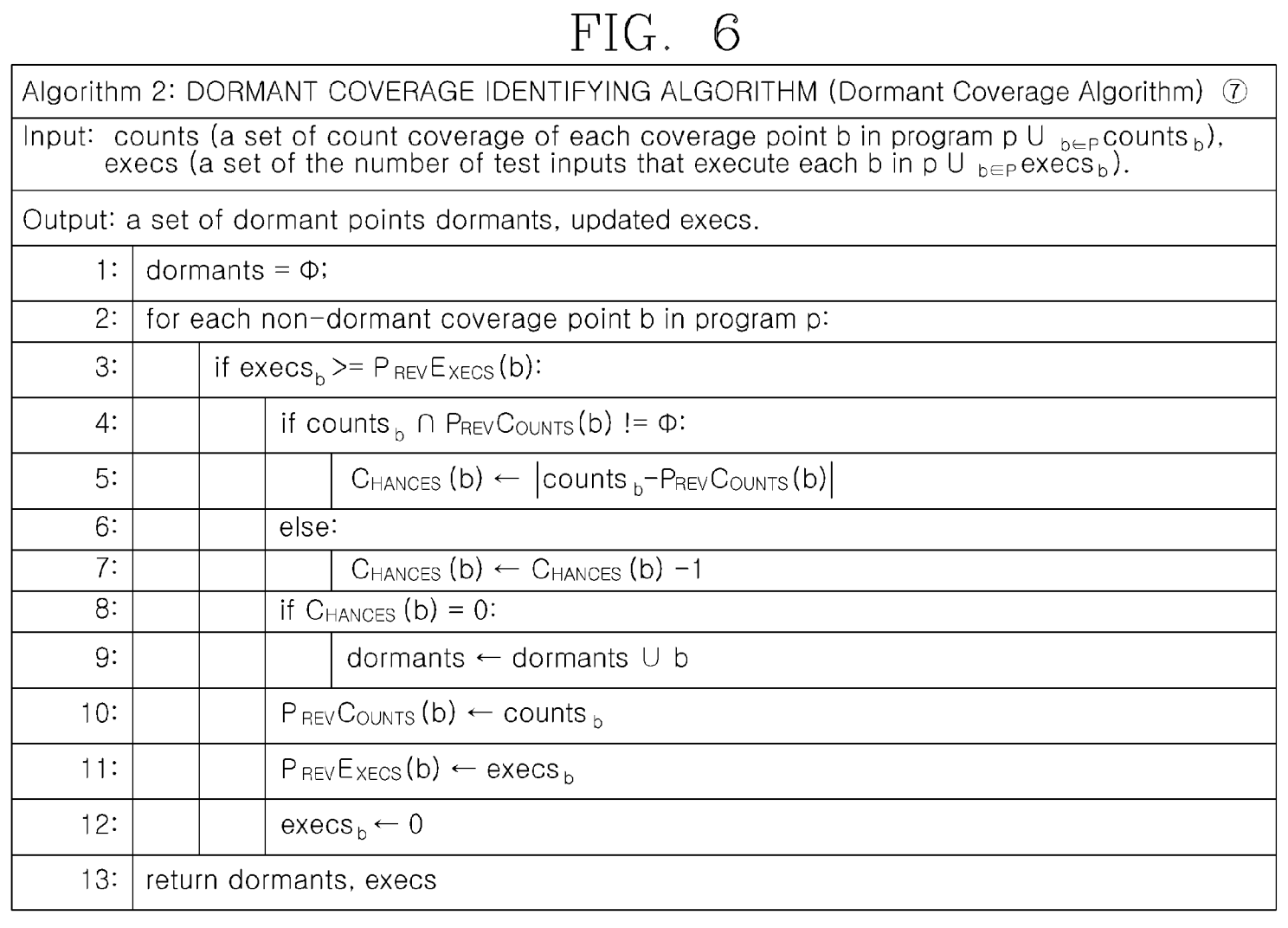

Algorithm 2: DORMANT COVERAGE IDENTIFYING ALGORITHM (Dormant Coverage Algorithm) ⑦

Input: counts (a set of count coverage of each coverage point b in program p $\cup_{b \in P}$ counts$_b$).
 execs (a set of the number of test inputs that execute each b in p $\cup_{b \in P}$ execs$_b$).

Output: a set of dormant points dormants, updated execs.

| | |
|---|---|
| 1: | dormants = $\Phi$; |
| 2: | for each non-dormant coverage point b in program p: |
| 3: | if execs$_b$ >= $P_{REV}E_{XECS}$ (b): |
| 4: | if counts$_b$ $\cap$ $P_{REV}C_{OUNTS}$ (b) != $\Phi$: |
| 5: | $C_{HANCES}$ (b) ← $\left| \text{counts}_b - P_{REV}C_{OUNTS}(b) \right|$ |
| 6: | else: |
| 7: | $C_{HANCES}$ (b) ← $C_{HANCES}$ (b) −1 |
| 8: | if $C_{HANCES}$ (b) = 0: |
| 9: | dormants ← dormants $\cup$ b |
| 10: | $P_{REV}C_{OUNTS}$ (b) ← counts$_b$ |
| 11: | $P_{REV}E_{XECS}$ (b) ← execs$_b$ |
| 12: | execs$_b$ ← 0 |
| 13: | return dormants, execs |

FIG. 7

| Algorithm 3: ADAPTIVE INSTRUMENTATION ALGORITHM (Adaptive Instrumentation Algorithm) ⑥ | |
|---|---|
| Input: | program p, |
| | the set of all dormant coverage points in P totalDormCov, |
| | the set of the number of tests that execute each coverage point b in p execs, |
| | the set of all executed coverage points in P totalCov, |
| | time t |
| Output: | updated p, updated totalDormCov, updated execs, updated t |
| 1: | if GetTimeNow()>= NexInstrumentationTime():              //DETERMINE PERIOD |
| 2: | dormCov, execs←ComputeDorm(totalCov, exrcs)              //RETRIEVE |
| 3: | totalDormCov ← totalDormCov ∪ dormCov |
| 4: | if totalCov ⊉ totalDormCov ∧ dormCov ≠ Φ: |
| 5: | p ← RemoveDormantInstrumentation(p, totalDormCOV) |
| 6: | else if totalCov ⊑ totalDormCov: |
| 7: | p ← RecoverAllInstrumentation(p) |
| 8: | totalDormCov ← Φ |
| 9: | t ← t * 2 |
| 10: | NewInstrumentationTime() ← GetTimeNow() + t |
| 11: | return p, dormCov, t |

FIG. 8

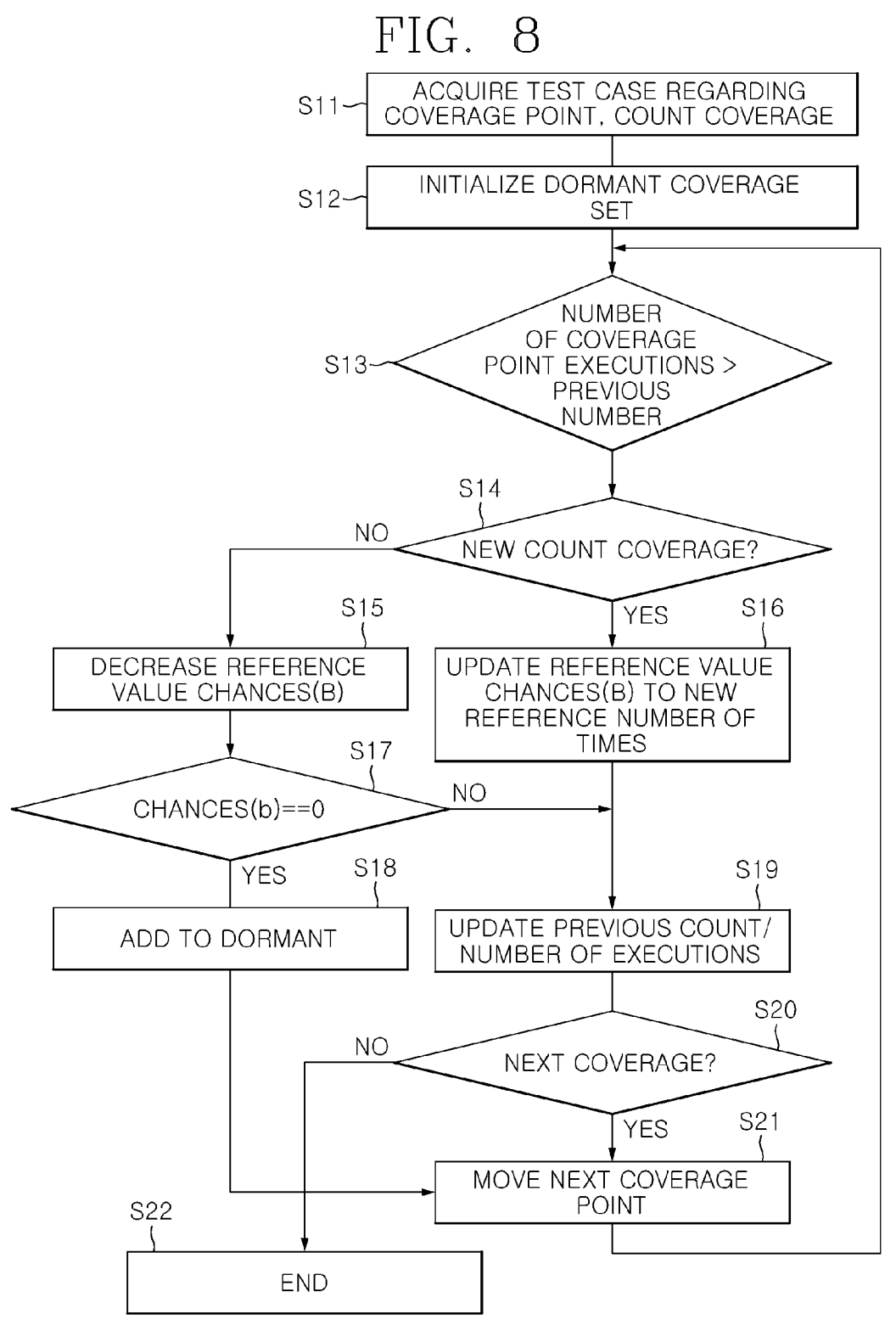

S11 — ACQUIRE TEST CASE REGARDING COVERAGE POINT, COUNT COVERAGE

S12 — INITIALIZE DORMANT COVERAGE SET

S13 — NUMBER OF COVERAGE POINT EXECUTIONS > PREVIOUS NUMBER

S14 — NEW COUNT COVERAGE?

NO

S15 — DECREASE REFERENCE VALUE CHANCES(B)

YES

S16 — UPDATE REFERENCE VALUE CHANCES(B) TO NEW REFERENCE NUMBER OF TIMES

S17 — CHANCES(b)==0

NO

YES

S18 — ADD TO DORMANT

S19 — UPDATE PREVIOUS COUNT/ NUMBER OF EXECUTIONS

S20 — NEXT COVERAGE?

NO

YES

S21 — MOVE NEXT COVERAGE POINT

S22 — END

METHOD, DEVICE, SYSTEM, AND COMPUTER PROGRAM FOR COVERAGE-GUIDED SOFTWARE FUZZING

CROSS-REFERENCE TO RELATED APPLICATIONS

This application is based on and claims priority under 35 U.S.C. 119 to Korean Patent Application No. 10-2022-0083972 filed on Jul. 7, 2022, and Korean Patent Application No. 10-2022-0141128 filed on Oct. 28, 2022 in the Korean Intellectual Property Office, the disclosure of which is herein incorporated by reference in its entirety.

BACKGROUND

1. Field

The present disclosure relates to a method, a device, a system, and a computer program for coverage-guided software fuzzing and, more specifically, to a method, a device, a system, and a computer program for coverage-guided software fuzzing, wherein when software under test is subjected to coverage-guided fuzzing, instrumentation overhead is reduced such that efficient fuzzing can be performed.

2. Description of Related Art

Software fuzzing refers to a test technology for verifying errors, security, and the like of a program under test (PUT) while generating/inputting various tests and then executing the tests.

More specifically, as illustrated in FIG. 1, coverage-guided fuzzing is a technology wherein information is collected while tracking a code area (that is, coverage) which is executed according to various input values, and the collected information is utilized to verify whether errors occur in the program, and the like. Coverage-guided fuzzing has sensed various security vulnerabilities and the like in various pieces of software, such as Android, Linux, and Chrome, thereby verifying merits thereof, and thus drawn attention.

However, the coverage-guided fuzzing has limitations in that very large overhead for coverage measurement makes it difficult to perform the PUT effectively. As a more specific example, in the case of a program in which an instrumentation code for coverage measurement has been inserted, the execution time may correspond to 2-10 times that of the program prior to insertion of the instrumentation code.

In an attempt to reduce instrumentation overhead during the coverage-guided fuzzing, a technique has been proposed such that, if a coverage point is executed by a specific test input, the instrumentation code of the executed coverage point is removed.

However, such a technique has a problem in that, since instrumentation code is removed by a single execution, it becomes difficult to perform an additional instrumentation related to the coverage point, thereby degrading the program vulnerability detecting performance.

In addition, the conventional coverage-guided fuzzing technique has limitations in that, since some programming languages such as C/C++ have been targeted when designing the same, it is difficult to apply the same to various other programming languages such as Java.

Accordingly, there has been a continuing demand for a scheme for solving the problem in that, in connection with performing coverage-guided fuzzing, program vulnerability detecting performance is degraded after an instrumentation code is removed by a single execution, thereby detecting program vulnerability quickly and accurately, and guaranteeing that the same can be widely applied to various programming languages.

SUMMARY

The present disclosure has been made to solve the above-mentioned problems of the prior art, and it is an aspect of the present disclosure to provide a method, a device, a system, and a computer program for coverage-guided software fuzzing, wherein program vulnerabilities can be detected quickly and accurately by solving the problem in that, in connection with performing coverage-guided fuzzing, program vulnerability detecting performance is degraded after an instrumentation code is removed by a single execution.

It is another aspect of the present disclosure to provide a method, a device, a system, and a computer program for coverage-guided software fuzzing, which can be widely applied not only to C/C++, but also to various other programming language environments such as Java.

Technical problems to be solved by the present disclosure are not limited to the above-mentioned technical problems, and other technical problems not mentioned herein will be clearly understood from the following description by those skilled in the art to which the present disclosure pertains.

In accordance with an aspect of the present disclosure, a method is performed by a processor inside a device so as to perform a fuzzing test using an instrumentation code inserted into points of a program under test, and the method includes: calculating an executed coverage according to which the instrumentation code is executed while inputting a test input value into an execution of the program under test; calculating a dormant coverage indicating each point having instrumentation code that has not been executed within a range of a reference number of times of the points, wherein the reference numbers of times are determined with regard to the respective points while determining whether the instrumentation code has been executed by the execution of the program under test on the test input value; and updating the program under test by adding or removing the instrumentation code on the basis of the dormant coverage.

The method may further include generating an mutated input values to be input to the program under test from a seed input value, wherein a number of the mutated input values is determined based on the dormant coverage, and wherein the test input value is one of the mutated input values.

The updating may include inserting the instrumentation code into the program under test on the basis of the dormant coverage for predetermined periods.

The dormant coverage may be calculated prior updating the instrumentation code of the program under test in each predetermined period on the basis of the calculated dormant coverage.

The updating may be, responsive to determining that there is a dormant coverage newly calculated in the calculating of a dormant coverage, removing an instrumentation code of a point corresponding to the newly calculated dormant coverage.

In the updating, responsive to determining that all executed coverages accumulated so far are included in all dormant coverages accumulated so far, all instrumentation codes of the program under test may be restored, all dormant coverages accumulated so far are initialized, and the predetermined period may be increased.

In the calculating of the dormant coverage, a dormant coverage in which the instrumentation code of each point is not executed is calculated while updating the reference number of times related to each point according to whether the instrumentation code of each point is executed.

In the calculating of the dormant coverage, the differences between the numbers of times the instrumentation code of the respective points has been executed in a preceding period and the numbers of times the instrumentation code of the respective points has been executed in a current period may be calculated as the reference numbers of times of the respective points, while calculating the dormant coverage in each of predetermined periods.

In the calculating of the dormant coverage, the reference number of times may be reduced with regard to each point for which no instrumentation code has been executed in a current one of the periods such that points having the reference number of times reduced to a reference value or less are added to dormant coverages.

The number of mutated test input values to be generated may be determined on the basis of the ratio between all non-dormant coverages obtained by subtracting all dormant coverages accumulated so far from all executed coverages accumulated so far, and non-dormant coverages obtained by subtracting dormant coverages related to the input value from executed coverages executed by the input value.

In another general aspect, a method is performed by a processor inside a device so as to perform a coverage-guided fuzzing test by using an instrumentation code inserted into points of a program under test, and the method includes: calculating an executed coverage according to which the instrumentation code is executed while inputting a test input value into an execution of the program under test; calculating a dormant coverage indicating each point having instrumentation code that has not been executed within a range of a reference number of times of the points, wherein the reference numbers of times are determined with regard to the respective points while determining whether the instrumentation code has been executed by the execution of the program under test on the test input value; and updating the program under test by adding or removing the instrumentation code on the basis of the dormant.

In the calculating of the dormant coverage, a dormant coverage in which the instrumentation code of each point is not executed may be calculated while updating the reference number of times related to each point according to whether the instrumentation code of each point is executed.

In the calculating of the dormant coverage, the difference between the number of times the instrumentation code of the respective points has been executed in a preceding period and the number of times the instrumentation code of the respective points has been executed in a current period may be calculated as the reference numbers of times of the respective points, while calculating the dormant coverage in each of predetermined periods.

In the calculating of the dormant coverage, the reference number of times may be reduced with regard to each point for which no instrumentation code has been executed in a current one of the periods such that points having the reference number of times reduced to a reference value or less are added to dormant coverages.

The number of mutated test input values to be generated may be determined on the basis of the ratio between all non-dormant coverages obtained by subtracting all dormant coverages accumulated so far from all executed coverages accumulated so far, and non-dormant coverages obtained by subtracting dormant coverages related to the seed input value from executed coverages executed by the seed input value.

In another general aspect, a computer-readable storage medium stores instructions which, when executed by a processor, cause a device including the processor to perform operations of performing a coverage-guided fuzzing test of a program under test having instrumentation code inserted at respective points of the program under test, the operations including: performing the fuzzing test by passing test inputs to executions of the program under test and determining, according to outputs of instrumentation code, coverages of the executions; based on the coverages, determining a dormant coverage of points of the program under test; based on the dormant coverage adapting the instrumentation code by adding or removing instrumentation code at some of the points according to the dormant coverage, wherein whether instrumentation code is added or removed at a point is determined based on whether an execution count of the point falls within a range of execution counts.

A method, a device, a system, and a computer program for a fuzzing test according to an embodiment of the present disclosure are advantageous in that program vulnerabilities can be detected quickly and accurately by solving the problem in that, in connection with performing coverage-guided fuzzing, program vulnerability detecting performance is degraded after an instrumentation code is removed by a single execution.

In addition, a method, a device, a system, and a computer program for a fuzzing test according to an embodiment of the present disclosure are advantageous in that the fuzzing test can be widely applied not only to C/C++, but also to various other programming language environments such as Java.

Advantageous effects obtainable from the present disclosure are not limited to the above-mentioned advantageous effects, and other advantageous effects not mentioned herein will be clearly understood from the descriptions herein by those skilled in the art to which the present disclosure pertains.

BRIEF DESCRIPTION OF THE DRAWINGS

The accompanying drawings included as a part of the detailed description to help understanding of the present disclosure provide embodiments of the present disclosure and illustrate the technical idea of the present disclosure together with the detailed description.

FIG. 3 is a flowchart of a fuzzing test method according to an embodiment of the present disclosure.

FIG. 4 to FIG. 7 illustrate detailed operations of a fuzzing test method according to an embodiment of the present disclosure.

FIG. 8 and FIG. 9 are detailed flowcharts of a fuzzing test method according to an embodiment of the present disclosure.

DETAILED DESCRIPTION

Figure 1:
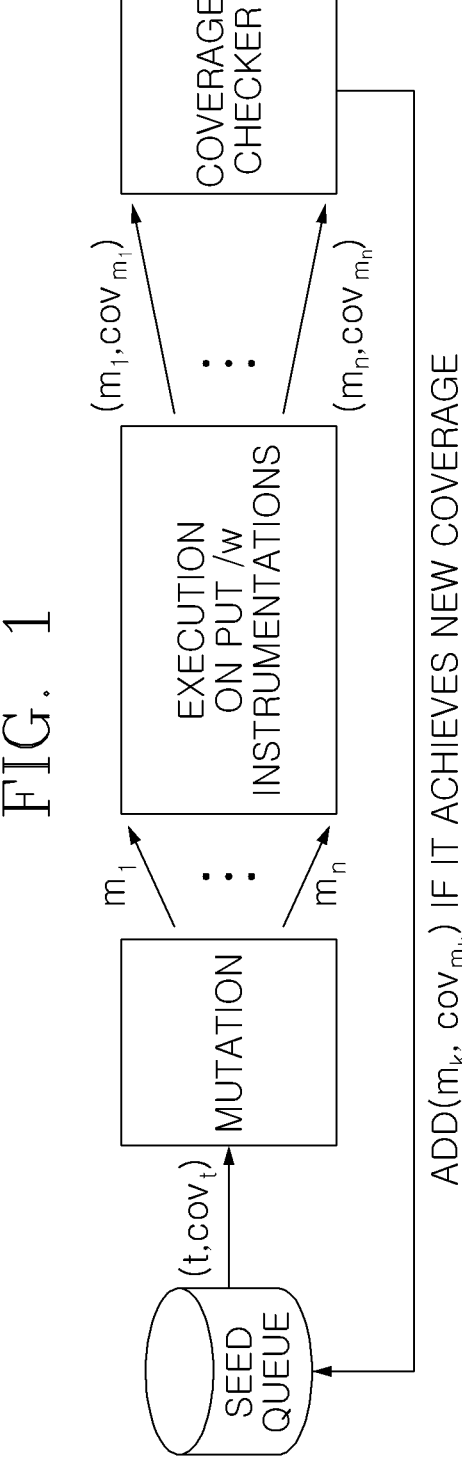
FIG. 1 illustrates a conventional fuzzing test according to the prior art.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, embodiments disclosed herein will be described in detail with reference to the accompanying drawings. Aspects, specific advantageous effects, and novel features of the present disclosure will become clear from following detailed descriptions of exemplary embodiments taken in conjunction with the accompanying drawings.

Terms or words used herein and in the claims have concepts defined by inventors to best describe the present disclosure, are to be interpreted in meanings and concepts conforming to the technical idea of the present disclosure, are only for describing embodiments, and are not to be interpreted as limiting the present disclosure.

In connection with assigning reference numerals to components, identical of similar components are given identical reference numerals, and repeated descriptions thereof will be omitted. The expressions "module" and "unit" used in conjunction with components are assigned or used interchangeably for convenience of description, and may denote software or hardware components without having meanings of roles distinguished from one another on their own.

In in connection with describing components of the present disclosure, a component expressed in a singular form is to be understood as including the plural form thereof unless specifically mentioned otherwise. In addition, the terms "first", "second", and the like are used to identify one component from another, and components are not limited by such terms. In addition, the description that a component is connected to another component means that these components may be connected via still another component therebetween.

In addition, in connection with describing embodiments disclosed herein, detailed descriptions of relevant prior arts will be omitted if deemed to be likely to obscure the gist of the embodiments disclosed herein. In addition, the accompanying drawings are only for helping understanding of embodiments disclosed herein, and the technical idea disclosed herein is not limited by the accompanying drawings, and is to be understood as encompassing all changes, equivalents, and replacements falling into the idea and technical scope of the present disclosure.

Hereinafter, exemplary embodiments of a method, a device, a system, and a computer program for a fuzzing test having an improved processing performance according to the present disclosure will be described in detail with reference to the accompanying drawing.

Figure 2:
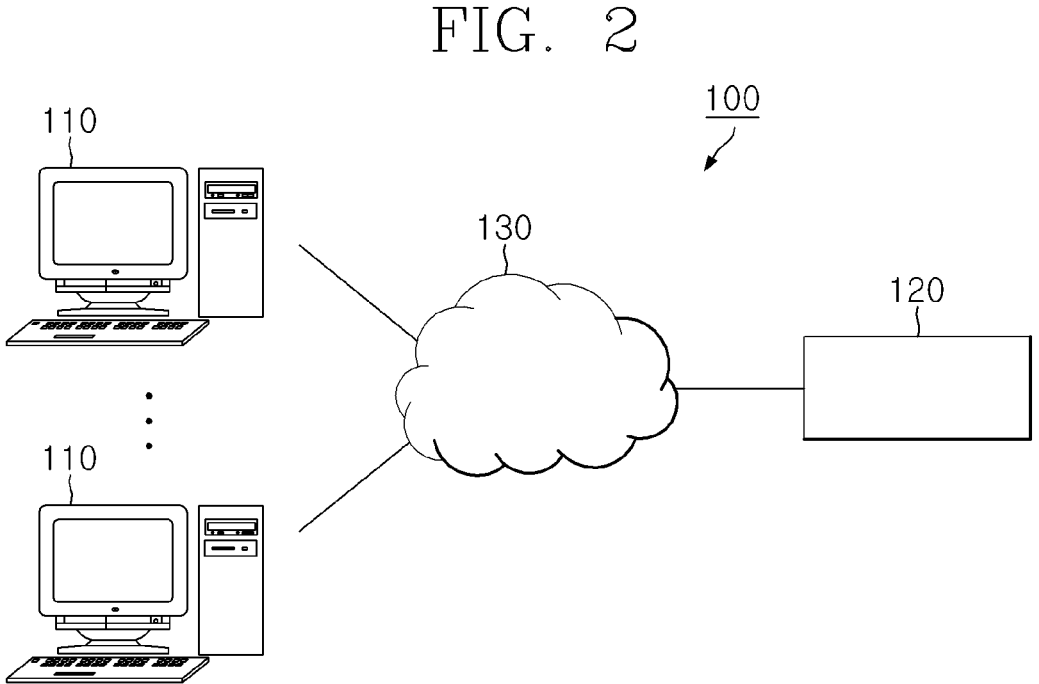
FIG. 2 illustrates a driving environment of a fuzzing test system according to an embodiment of the present disclosure.

FIG. 2 illustrates a driving environment of a fuzzing test system 100 according to an embodiment of the present disclosure. As illustrated in FIG. 2, the fuzzing test system 100 according to an embodiment of the present disclosure may include a terminal 110 configured to provide a program under test (PUT) and a fuzzing test device 120 configured to perform a fuzzing test with regard to the PUT provided by the terminal 110.

The terminal 110 may be an information processing device having a CPU or the like for operation processing and, more specifically, may be a personal computerized processing device such as a desktop computer, a laptop, a tablet, or a smartphone. In addition, various devices such as a server may be used as the terminal 110.

In addition, the fuzzing test device 120 may be implemented by using one or at least two servers, but the present disclosure is not necessarily limited thereto. The fuzzing test device 120 may also be configured by using a personal computerized processing device such as a desktop computer, a laptop, a tablet, or a smartphone, may be implemented as a dedicated device for a fuzzing test, or implemented in various other types (for example, a cloud server).

In addition, a wired network, a wireless network, or the like may be used as a communication network 130 connecting the fuzzing test device 120 and the terminal 110 in FIG. 2. Specifically, various communication networks such as a local area network (LAN), a metropolitan area network (MAN), a wide area network (WAN), and the like may be used. The communication network 130 may also include the world wide web (WWW) known in the art. The communication network 130 may also be implemented by using a data bus or the like configured such that data or the like can be transmitted/received.

In the fuzzing test system 100 according to the present disclosure, the fuzzing test device 120 does not necessarily transmit/receive predetermined data with the terminal 110 through the communication network 130. The fuzzing test device 120 may be configured integrally with the terminal 110 or may be implemented in various other manners such that, for example, the PUT is directly retrieved from a storage device or the like provided in the fuzzing test device 120 to perform a fuzzing test.

A fuzzing test method according to an embodiment of the present disclosure may be a method in which a processor inside the device 120 or 200 inserts an instrumentation code into at least point with regard to a PUT and performs a fuzzing test, as illustrated in FIG. 3, the method including calculating an executed coverage in which the instrumentation code is executed while inputting at least one test input value into the PUT and executing the same (S110); calculating a dormant coverage in which the instrumentation code of each point is not executed within the range of a reference number of times determined with regard to each point while identifying whether the instrumentation code is executed by the at least one test input value with regard to each point (S120); and adding or removing an instrumentation code inserted into the PUT on the basis of the dormant coverage, thereby updating the same (S130).

The method may further include generating an input value to be input to the PUT from a seed input value by determining the number of test input values to be generated on the basis of the dormant coverage (not illustrated).

In addition, in the updating (S130), the instrumentation code inserted into the PUT may be updated on the basis of the dormant coverage in each predetermined period.

In the calculating of a dormant coverage (S120), the dormant coverage may be calculated prior to update of the instrumentation code in each predetermined period such that the instrumentation code is updated on the basis of the calculated dormant coverage.

In addition, in the updating (S130), if there exists a dormant coverage newly calculated in the dormant coverage calculating step (S120), an instrumentation code of a point corresponding to the newly calculated dormant coverage may be removed.

Moreover, in the updating (S130), if all executed coverages accumulated so far are included in all dormant coverages accumulated so far, all instrumentation codes of the PUT may be restored, all dormant coverages accumulated so far may be initialized, and the predetermined period may be increased.

In addition, in the calculating of a dormant coverage (S120), a dormant coverage in which the instrumentation code of each point is not executed may be calculated while updating the reference number of times related to each point according to whether the instrumentation code of each point is executed.

In addition, in the calculating of a dormant coverage (S120), the difference between the number of times the instrumentation code of each point has been executed in a preceding period and the number of times the instrumentation code of each point has been executed in the current period may be calculated as the reference number of times related to each point, while calculating the dormant coverage in each predetermined period.

In the calculating of a dormant coverage (S120), the reference number of times may be reduced with regard to each point for which no instrumentation code has been executed in the current period such that points having the reference number of times reduced to a reference value or less are added to dormant coverages.

In addition, in the generating of an input value (not illustrated), the number of test input values to be generated may be determined on the basis of the ratio between all non-dormant coverages obtained by subtracting all dormant coverages accumulated so far from all executed coverages accumulated so far, and non-dormant coverages obtained by subtracting dormant coverages related to the seed input value from executed coverages executed by the seed input value.

In addition, the method illustrated in FIG. 3 may be performed by the fuzzing test device 120, for example, and the fuzzing test device 120 may be implemented to include a computing device 200 described later with reference to FIG. 12. For example, the fuzzing test device 120 may include a processor 10, and the processor 10 may perform an instruction configured to implement an operation for performing a fuzzing test, thereby performing a fuzzing test with regard to a PUT.

Accordingly, a method, a device, and a system for a fuzzing test according to an embodiment of the present disclosure may quickly and accurately detect program vulnerabilities by solving the problem in that, in connection with performing coverage-guided fuzzing, program vulnerability detecting performance is degraded after an instrumentation code is removed by a single execution. Furthermore, the fuzzing test can be widely applied not only to C/C++, but also to various other programming language environments such as Java.

Hereinafter, a method, a device, and a system for a fuzzing test according to an embodiment of the present disclosure will be described in more detail with reference to FIG. 1 and FIG. 2.

Firstly, in the calculating of an executed coverage (S110), the fuzzing test device 120 calculates an executed coverage in which the instrumentation code is executed while inputting at least one test input value into the PUT and executing the same.

More specifically, in a fuzzing test method according to an embodiment of the present disclosure, in order to calculate the executed coverage, i) a set of coverage points executed by test inputs and ii) a set of the number of times respective coverage points have been executed at respective input values (count coverage set) may be considered.

For example, assuming that two points p1 and p2 and two different test input values t1 and t2 are given, and assuming that, when t1 is used as an input value, p1 is repeatedly executed three times, and p2 is repeatedly executed six times, and that, when t2 is used as an input value, p1 is repeatedly executed seven times, then the coverage point set may be {p1, p2}, the count coverage set of p1 may be {3,7}, and the count coverage set of p2 may be {6}.

Accordingly, in connection with calculating an executed coverage in which the instrumentation code is executed in the calculating of an executed coverage (S110), one or both of the coverage point set and the count coverage set may be considered, and it is also possible to calculate the executed coverage by considering other values together.

More specifically, the fuzzing test device 120 may receive the PUT from the terminal 110 of the like, and may add an instrumentation code to each coverage point of a branch, a basic block, and the like inside the PUT.

Then, the fuzzing test device 120 may use a random number in order to generate an initial test input value, but the present disclosure is not necessarily limited thereto.

Figure 4:
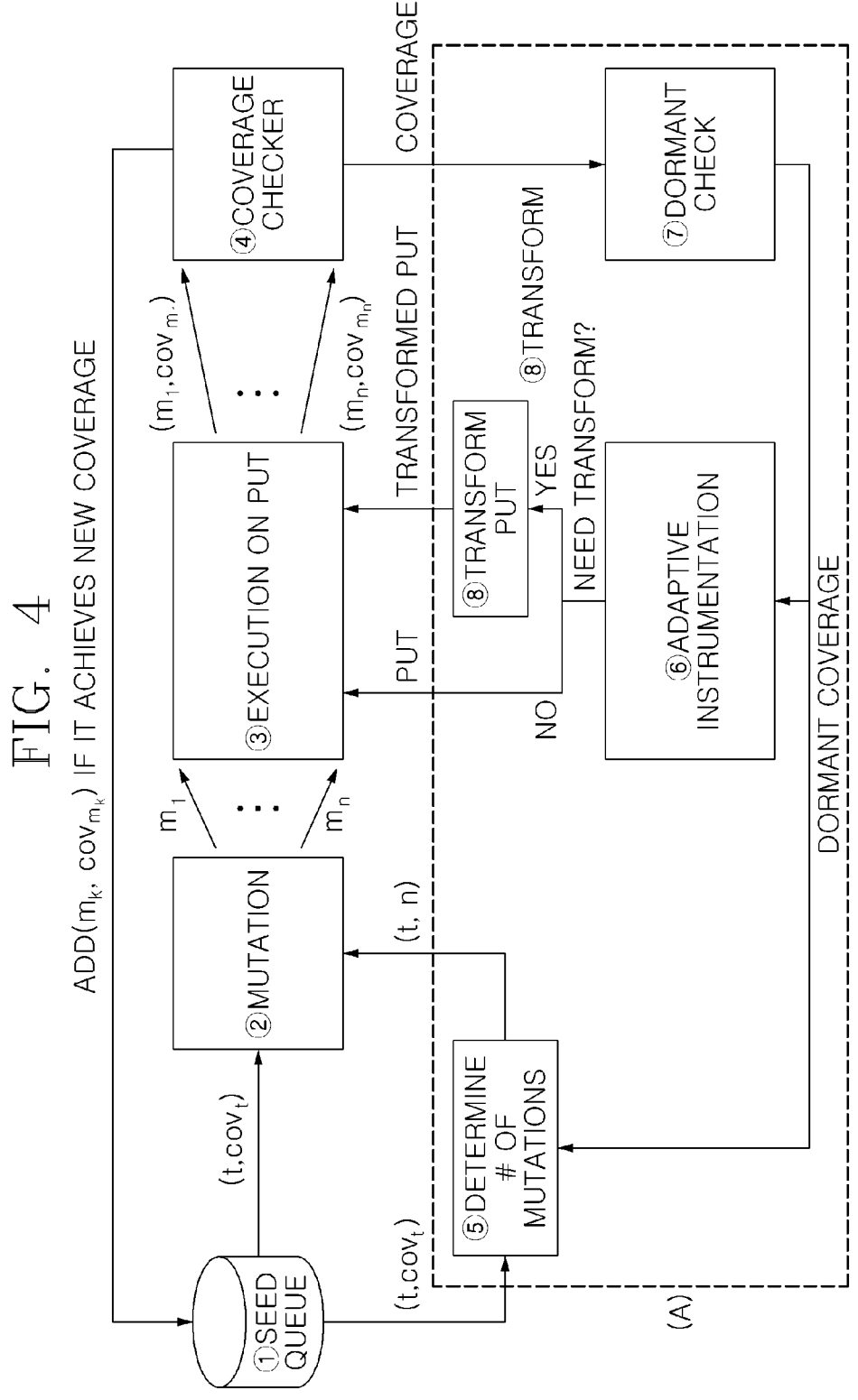

In this regard, FIG. 4 illustrates detailed operations of a fuzzing test method according to an embodiment of the present disclosure.

As illustrated in FIG. 4, as the test input value, at least one mutated value (for example, $m_1, \ldots, m_n$ in FIG. 4) may be generated and used with regard to an already used test input value (②) in FIG. 4).

The at least one mutated value (for example, $m_1, \ldots, m_n$ in FIG. 4) may be generated by considering an executed coverage regarding the already used test input value (for example, $(t, cov_t)$ in FIG. 4) and then used as a test input value.

Furthermore, in the present disclosure, in order to calculate the mutated test input value, the fuzzing test device 120 may first determine the number of mutated test input values to be generated (⑤) in FIG. 4).

Accordingly, in step S110, a coverage in which the instrumentation code is executed (for example, $(m_1, cov_{m1})$, $\ldots, (m_n, cov_{mn})$ in FIG. 4) is calculated (④ in FIG. 4) while inputting the at least one mutated test input value (for example, $m_1, \ldots, m_n$ in FIG. 4) into the PUT and executing the same (③) in FIG. 4.)

As illustrated in FIG. 4, a test input value having a new executed coverage may be again used as seed data to generate at least one mutated test input value (for example, $m_1, \ldots, m_n$ in FIG. 4).

Thereafter, in the calculating of a dormant coverage (S120), the fuzzing test device 120 calculates a dormant coverage in which the instrumentation code of each point is not executed within the range of a reference number of times determined (with regard to each point), which may be done while identifying whether each point of the PUT is executed by the at least one test input value (⑦ in FIG. 4).

In the fuzzing test method according to an embodiment of the present disclosure, if each coverage point fails to accomplish a new count coverage during a predetermined period, the dormant coverage identifying algorithm may deem the same as a dormant coverage.

More specifically, in the fuzzing test method according to an embodiment of the present disclosure, instead of determining whether each instrumentation point is executed, the dormant coverage identifying algorithm may identify dormant coverage by considering whether each instrumentation point accomplishes a new count coverage (number of repetitions) in each period, and it is also possible to calculate the dormant coverage by considering other values together.

The fuzzing test device 120 may input all of the at least one mutated test input value into a PUT, execute the same, and then search for a new dormant coverage.

As a more detailed example, in the calculating of a dormant coverage (S120), the difference between the number of times the instrumentation code of each point has been executed in a preceding period and the number of times the instrumentation code of each point has been executed in the current period may be calculated as the reference number of times related to each point, while calculating the dormant coverage in each predetermined period. The reference number of times may be reduced with regard to each point for which no instrumentation code has been executed in the current period such that points having the reference number of times reduced to a reference value or less are added to dormant coverages.

In addition, in the updating (S130), an instrumentation code inserted into the PUT may be added or removed on the basis of the dormant coverage, thereby updating the same.

More specifically, in the updating (S130), the calculated dormant coverage may be considered to remove an instrumentation code inserted into the PUT or to restore all instrumentation codes inserted into the PUT.

Accordingly, the fuzzing test device 120 may use the calculated dormant coverage so as to update the instrumentation code of the PUT (⑥ and ⑧ in FIG. 4), and may also use the calculated dormant coverage so as to determine the number of mutated test input values to be generated (⑤ in FIG. 4).

In addition, the above-mentioned series of processes may be repeatedly performed until a test time previously input by the user expires.

More specifically, FIG. 5 illustrates a pseudo code regarding the entire algorithm of a coverage-guided fuzzing method according to an embodiment of the present disclosure.

Inputs to the algorithm in FIG. 5 may include a PUT p, t1 for configuring a time limit regarding a fuzzing test, and t2 which refers to a time used by an adaptive instrumentation algorithm ⑥ n FIG. 4. Outputs therefrom may include a set of test input values and a set of test input values that cause errors of the PUT.

Accordingly, as illustrated in FIG. 5, multiple parameters are first initialized (rows 1-3 in FIG. 5). In FIG. 5, S refers to a set of pairs of test input values and coverages accomplished by the test input values. In the initial state, a random input value (RANDOMSEQ) is generated, input to program p, and executed, thereby obtaining an executed coverage (coy) (first row in FIG. 5).

In addition, totalCov refers to a set of all executed coverages executed in program p (second row in FIG. 5). In addition, F refers to a set of test input values that caused errors in program p (third row in FIG. 5). In addition, totalDormCov refers to a set of all dormant coverages of program p (fourth row in FIG. 5). In addition, execs refers to the number of test cases that executed respective coverage points b of program p (fifth row in FIG. 5).

Rows 7-17 in the algorithm in FIG. 5 constitute a normal routine of coverage-guided fuzzing. Firstly, with regard to all pairs of test input values and coverages (for example, (t, $cov_t$)) included in S, the number of mutated test input values to be generated by using the corresponding test input values is determined (eighth row in FIG. 5).

Thereafter, new mutated test input values are generated as many as the number of mutated test input values (rows 9-10 in FIG. 5). Each generated mutated test input value is input to program p and then executed ($11^{th}$ row in FIG. 5), and the value of execs to be by an adaptive instrumentation algorithm (⑥ in FIG. 4) is updated ($12^{th}$ row in FIG. 5).

Thereafter, in rows 13-17 in FIG. 5, an executed coverage related to an executed mutation test input value and the result of execution are used to determine whether or not to store the corresponding mutation test input value in S and F. if the result of execution is a failure (FAILURE), the corresponding mutation test input value is added to F (rows 13-14 in FIG. 5). On the other hand, if the input value is not FAILURE and has accomplished a new coverage ($15^{th}$ row in FIG. 5), the corresponding mutation test input value is added to S, and the total executed coverage (totalCov) is updated (rows 16-17 in FIG. 5).

In addition, with regard to a single seq, all mutation test input values are generated and executed, and the adaptive instrumentation algorithm (⑥ in FIG. 4) is then retrieved to instrument program p again ($18^{th}$ row in FIG. 5), and the instrumentation code regarding program p is updated (⑧ in FIG. 4).

In addition, the above-mentioned series of processes may be repeatedly performed until the user configured time (t1) expires ($19^{th}$ row in FIG. 5).

FIG. 6 illustrates a pseudo code regarding a dormant coverage identifying algorithm (⑦ in FIG. 4) in connection with a coverage-guided fuzzing test method according to an embodiment of the present disclosure.

The dormant coverage identifying algorithm in FIG. 6 may receive, as inputs, execs which is a set of the number of test cases in which each coverage point b of PUT p is executed, and a count coverage count value which records the number of times b is executed during each execution of b by each test case.

Each test case may execute b multiple times during a single execution. Therefore, count coverage ($counts_b$) of b may be a set of values that record the number of times b is executed by all test cases that executed b.

In the dormant coverage identifying algorithm in FIG. 6, a coverage point that failed to accomplish a new coverage in multiple recent test executions may be identified as a dormant coverage.

More specifically, in the dormant coverage identifying algorithm in FIG. 6, the value of CHANCES(b) may be used to determine whether or not to identify each coverage point b as a dormant coverage. The value of CHANCES(b) may be dynamically adjusted on the basis of execution feedback. In this regard, CHANCES(b) may be a reference number of times of coverage point b for determining whether or not to classify coverage point b as a dormant coverage.

More specifically, in the dormant coverage identifying algorithm in FIG. 6, a set of dormant coverage points (dormants) is initialized (first row in FIG. 6).

With regard to each coverage point b not corresponding to a dormant coverage in the PUT p, it is confirmed whether b has been executed more than when the dormant coverage identifying algorithm was retrieved in the previous period (third row in FIG. 6).

Thereafter, CHANCES(b) which indicates the number of times b may not be classified as a dormant coverage even if b fails to accomplish a new executed coverage is updated (rows 4-7 in FIG. 6).

If b accomplished a new executed coverage in a recent execution (fourth row in FIG. 6), CHANCES(b) is updated to the value of the number of newly accomplished executions (fifth row in FIG. 6), thereby reducing the possibility that coverage point b that accomplishes more new executed coverages will be classified as a dormant coverage.

On the other hand, if b failed to accomplish a new executed coverage ($6^{th}$ row in FIG. 6), CHANCES(b) is decreased ($7^{th}$ row in FIG. 6).

Accordingly, if CHANCES(b) reaches 0 or a predetermined reference value as a result of a continued decrease in CHANCES(b) ($8^{th}$ row in FIG. 6), b is added to the set of dormant coverage points (dormants) ($9^{th}$ row in FIG. 6).

Thereafter, in rows 10-11 in FIG. 6, PREVCOUNT(b) and PREVEXECS(b) values are generated to be used by the dormant coverage identifying algorithm in the next period.

More specifically, the count coverage value ($counts_b$) of b in the current period is store in PREVCOUNT(b) ($10^{th}$ row in FIG. 6), and the number ($execs_b$) of test cases that executed b in the current period is stored in PREVEXECS (b) ($11^{th}$ row in FIG. 6).

Finally, the value of parameter ($execs_b$) regarding the number of test cases that executed b in the current period is initialized ($12^{th}$ row in FIG. 6).

After finishing identifying dormant coverages with regard to all coverage points b in this manner, the set of dormant coverage points (dormants) and the set of updated executed test cases (execs) are returned ($13^{th}$ row in FIG. 6).

FIG. 7 illustrates a pseudo code regarding an adaptive instrumentation algorithm (⑥ in FIG. 4) in connection with a coverage-guided fuzzing test method according to an embodiment of the present disclosure.

In the adaptive instrumentation algorithm in FIG. 7, points of dormant coverages identified by the dormant coverage identifying algorithm in FIG. 6 (⑦ in FIG. 4) from the PUT, and the total dormant coverage point may be restored.

More specifically, the adaptive instrumentation algorithm may receive, as inputs, a PUT p, a set of all dormant coverage points of p (totalDormCov), execs which stores the number of test cases that executed each coverage point b of p, a set of all executed coverage point (totalCov), and a period t designated by the user to execute the adaptive instrumentation algorithm.

Accordingly, the adaptive instrumentation algorithm is periodically executed (first row in FIG. 7), and retrieves the dormant coverage identifying algorithm (⑦ in FIG. 4) (second row in FIG. 7).

In addition, the adaptive instrumentation algorithm updates the total dormant coverage point (totalDormCov) by using a new dormant coverage point (dormCov) obtained through execution of the dormant coverage algorithm (third row in FIG. 7).

Thereafter, if the total executed coverage point (totalCov) is not included in the total dormant coverage point (totalDormCov), and if there exists a newly identified dormant coverage set (dormCov) (fourth row in FIG. 7), instrumentation codes for instrumenting a dormant coverage set are removed from the PUT p, and the PUT p is updated (fifth row in FIG. 7).

However, if the total executed coverage point (totalCov) is exceptionally included in the total dormant coverage point (sixth row in FIG. 7), all instrumentation codes in the PUT p are restored ($7^{th}$ row in FIG. 7). That is, all instrumentation codes are restored identically to the initially executed PUT p ($7^{th}$ row in FIG. 7), and the total dormant coverage point is initialized ($8^{th}$ row in FIG. 7).

In addition, the value of t is doubled or the like such that (i) the dormant coverage identifying algorithm can identify a dormant coverage more accurately, and (ii) overhead resulting from deletion of an instrumentation code from the PUT and reinsertion therein is reduced. That is, frequent re-instrumentation may increase overhead due to program transform, and this is prevented.

In addition, the coverage-guided fuzzing test method according to an embodiment of the present disclosure may determine the number of mutated test input values to be generated on the basis of dormant coverages identified by the dormant coverage identifying algorithm, and may generate a mutated test input value to e input to the PUT, thereby performing a fuzzing test.

More specifically, the number of mutated test input values newinputs) may be calculated by Equation 1 below:

$$newInputs\ (t) = \alpha * \frac{|\{cov_t\} - dormCov_t\}|}{\left|\left\{\bigcup_{s \in S} cov_s - \bigcup_{s \in S} dormCov_s\right\}\right|} \qquad [\text{Equation 1}]$$

Equation 1 above may be used to calculate the number of mutated test input values to be generated from a single test input value t.

In Equation 1 above, the number of mutated test input values to be generated is determined with referenced to what proportion of coverages the test input value t has executed among all current nondormant coverages.

More specifically, in Equation 1 above, $cov_t$ may refer to a set of executed coverage points calculated by executing t, $dormCov_t$ may refer to a set of dormant coverage points calculated by executing t, and S may refer to a set of all test cases executed so far.

In Equation 1, the number newinput(t) of mutated test input values to be generated from t may be calculated by a ratio of nondormant coverages accomplished by t among nondormant coverages accomplished by the set S of all test cases executed so far.

In addition, in Equation 1, $\alpha$ may be a coefficient configured by the user or the like as desired. As a specific example, if $\alpha$ is 1000, and the ratio between nondormant coverages executed by t and the total nondormant coverage is 50%, newinput(t) may be 500(=1000×0.5).

Figure 9:
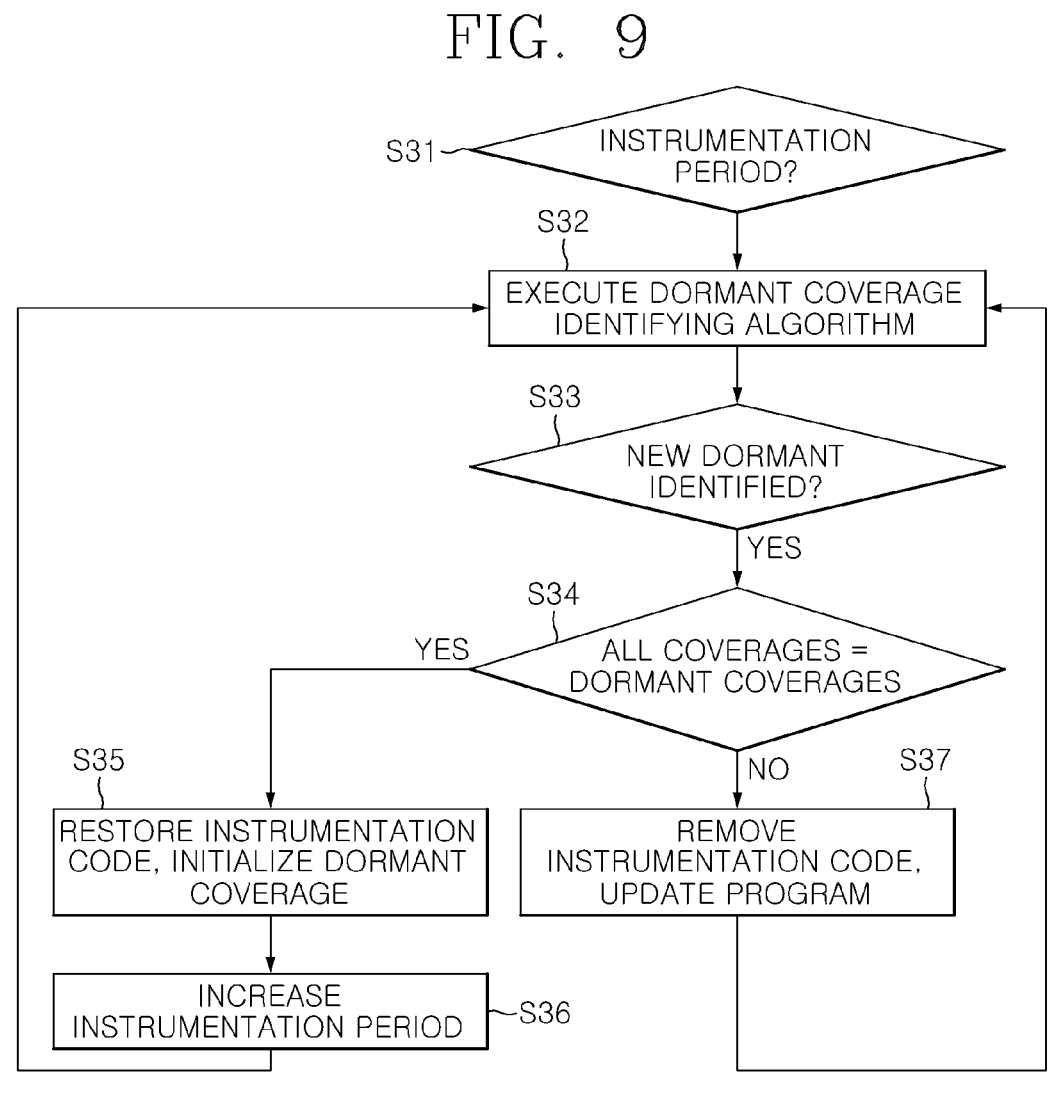

FIG. 8 and FIG. 9 illustrate detailed operations of a fuzzing test method according to an embodiment of the present disclosure.

The method illustrated in FIG. 8 and FIG. 9 may be performed by a fuzzing test device 120, for example, and the fuzzing test device 120 may be implemented to include a computing device 200 described later with reference to FIG. 12. For example, the fuzzing test device 120 may include a processor 10, and the processor 10 may perform an instruction configured to implement an operation for performing a fuzzing test, thereby performing a fuzzing test with regard to a PUT.

FIG. 8 is a flowchart of the dormant coverage identifying algorithm. As illustrated in FIG. 8, the dormant coverage identifying algorithm may first acquire a test case regarding a coverage point, and a count coverage (S11).

In addition, the dormant coverage identifying algorithm may initialize a set of dormant coverage points (dormants) (S12).

With regard to each coverage pint that does not correspond to a dormant coverage in a PUT, it is confirmed whether the number of executions of the coverage point is larger than the number of executions in the previous period (S13).

It is then confirmed whether the coverage point accomplishes a new executed coverage (S14).

If the coverage point accomplished a new executed coverage in a recent execution, CHANCES(b) is updated to the value of the number of newly accomplished executions (S16).

On the other hand, if the coverage point failed to accomplish a new executed coverage, CHANCES(b) is reduced (S15). If CHANCES(b) becomes 0 (S17), the coverage point b is added to dormant coverages (S18), the algorithm proceeds by moving to the next coverage point (S21).

If reduced CHANCES(b) is larger than 0, the count coverage value ($counts_b$) and the number of test cases that executed coverage points ($execs_b$) are stored to be used in the next period (S19). The dormant coverage identifying algorithm determines whether the next coverage point exists (S20), and moves to the next coverage point (S21), or ends (S22).

FIG. 9 is a flowchart of an adaptive instrumentation algorithm in connection with a coverage-guided fuzzing test method according to an embodiment of the present disclosure.

The adaptive instrumentation algorithm in FIG. 9 first determines whether a predefined instrumentation period has arrived (S31).

The adaptive instrumentation algorithm is executed periodically so as to execute the dormant coverage identifying algorithm (S32).

If a new dormant coverage is identified (S33), it is confirmed whether the total executed coverage point (totalCov) is identical to the total dormant coverage point (totalDormCov) (S34). If not identical, an instrumentation code is removed from a PUT, thereby performing an update (S37).

If the total executed coverage point (totalCov) is identical to the total dormant coverage point (totalDormCov), the total instrumentation code is restored in the PUT, the total dormant coverage is initialized (S35), the instrumentation period is increased (S36), and the adaptive instrumentation algorithm is performed again.

Figure 10:
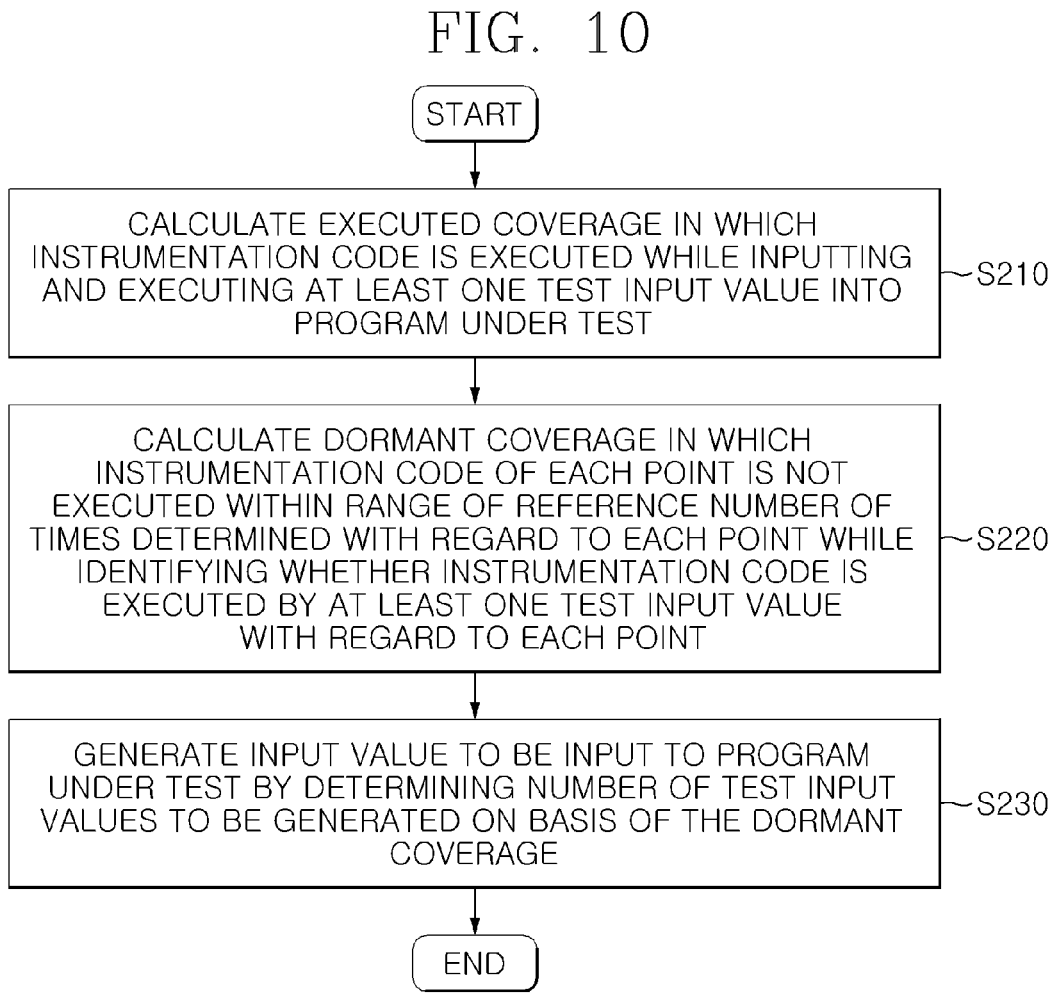
FIG. 10 is a flowchart of a fuzzing test method according to another embodiment of the present disclosure.

FIG. 10 is a flowchart of a fuzzing test method according to another embodiment of the present disclosure.

More specifically, a fuzzing test method according to another embodiment of the present disclosure may be a method in which a processor inside a device 120 or 200 inserts an instrumentation code into at least point with regard to a PUT and performs a fuzzing test, as illustrated in FIG. 10, the method including calculating an executed coverage in which the instrumentation code is executed while inputting at least one test input value into the PUT and executing the same (S210); calculating a dormant coverage in which the instrumentation code of each point is not executed within the range of a reference number of times determined with regard to each point while identifying whether each point is executed by the at least one test input value (S220); and generating an input value to be input to the PUT by determining the number of test input values to be generated on the basis of the dormant coverage (S230).

More details regarding the fuzzing test method according to another embodiment of the present disclosure in FIG. 10 are inferable from the above description of a fuzzing test method according to an embodiment of the present disclosure, and repeated descriptions thereof will be omitted herein.

In addition, in connection with the fuzzing test method according to another embodiment of the present disclosure, in the calculating of a dormant coverage (S220), a dormant coverage in which the instrumentation code of each point is not executed may be calculated while updating the reference number of times related to each point according to whether the instrumentation code of each point is executed.

In addition, in the calculating of a dormant coverage (S220), the difference between the number of times the instrumentation code of each point has been executed in a preceding period and the number of times the instrumentation code of each point has been executed in the current period may be calculated as the reference number of times related to each point, while calculating the dormant coverage in each predetermined period.

In addition, in the calculating of a dormant coverage (S220), the reference number of times may be reduced with regard to each point for which no instrumentation code has been executed in the current period such that points having the reference number of times reduced to a reference value or less are added to dormant coverages.

In addition, in the generating of an input value (S230), the number of test input values to be generated may be determined on the basis of the ratio between all non-dormant coverages obtained by subtracting all dormant coverages accumulated so far from all executed coverages accumulated so far, and non-dormant coverages obtained by subtracting dormant coverages related to the seed input value from executed coverages executed by the seed input value.

In addition, the method illustrated in FIG. 10 may be performed by a fuzzing test device 120, for example, and the fuzzing test device 120 may be implemented to include a computing device 200 described later with reference to FIG. 12. For example, the fuzzing test device 120 may include a processor 10, and the processor 10 may perform an instruction configured to implement an operation for performing a fuzzing test, thereby performing a fuzzing test with regard to a PUT.

Figure 11:
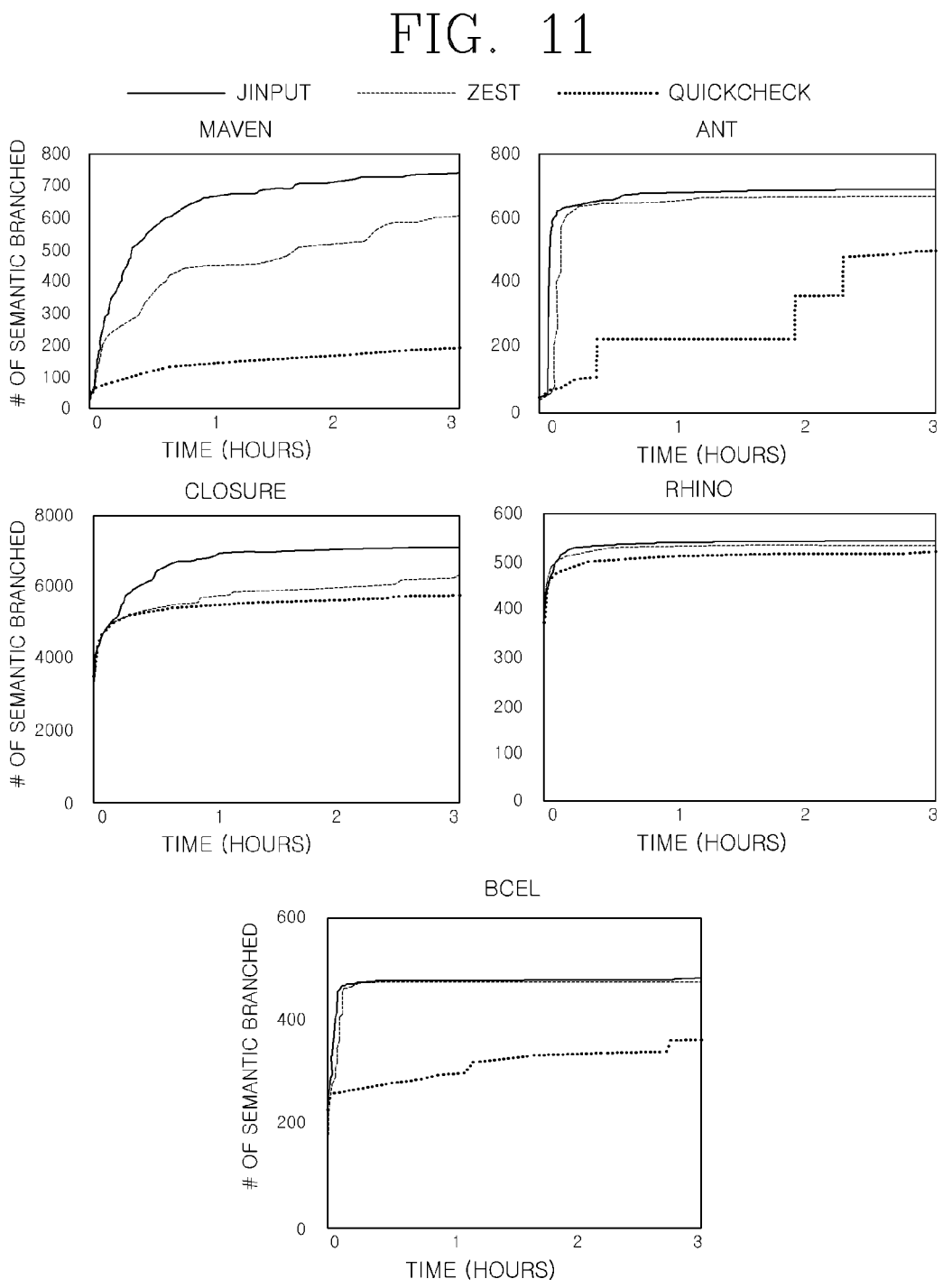
FIG. 11 illustrates advantageous effects a fuzzing test method according to an embodiment of the present disclosure.

In this regard, FIG. 11 illustrates advantageous effects a fuzzing test method according to an embodiment of the present disclosure.

More specifically, FIG. 11 illustrates results of comparing the performance of a coverage-guided fuzzing technique (JInput) according to an embodiment of the present disclosure with a coverage-guided fuzzing technique (Zest) according to the prior art and a random testing technology (QuickCheck) by using five benchmark programs (Maven, Ant, Closure, Rhino, and BCEL).

In FIG. 11, the horizontal axis denotes elapsed hours, and the vertical axis denotes a coverage (number of branch statements) accomplished by each technology.

It is clear from FIG. 11 that the coverage-guided fuzzing technique (JInput) according to an embodiment of the present disclosure can accomplish more coverages more quickly than the conventional technologies (Zest and QuickCheck) over time.

Accordingly, a method, a device, a system, and a computer program for a fuzzing test according to an embodiment of the present disclosure can detect program vulnerabilities quickly and accurately by solving the problem in that, in connection with performing coverage-guided fuzzing, program vulnerability detecting performance is degraded after an instrumentation code is removed by a single execution, and can widely apply a fuzzing test to various programming language environments.

The above-mentioned method for performing a fuzzing test according to an embodiment of the present disclosure can be implemented as a computer-readable code in a computer-readable storage medium which stores instructions configured to implement operations which, when executed by a processor, cause a device including the processor to insert an instrumentation code into at least one point with regard to a PUT, thereby performing a fuzzing test. The computer-readable storage medium may continuously store a computer-executable program or may temporarily store the same for execution or download. In addition, the storage medium may be various recording means or storage means to which a single piece of hardware or multiple pieces of hardware are coupled. The storage medium is not limited to a medium that directly accesses a computer system, and may exist while being distributed over a network. Therefore, the above detailed description is not to be interpreted as limiting, but as being exemplary. The scope of the present disclosure is to be determined by rational interpretation of the accompanying claims, and all changes within the equivalent scope of the present disclosure fall into the scope of the present disclosure.

Figure 12:
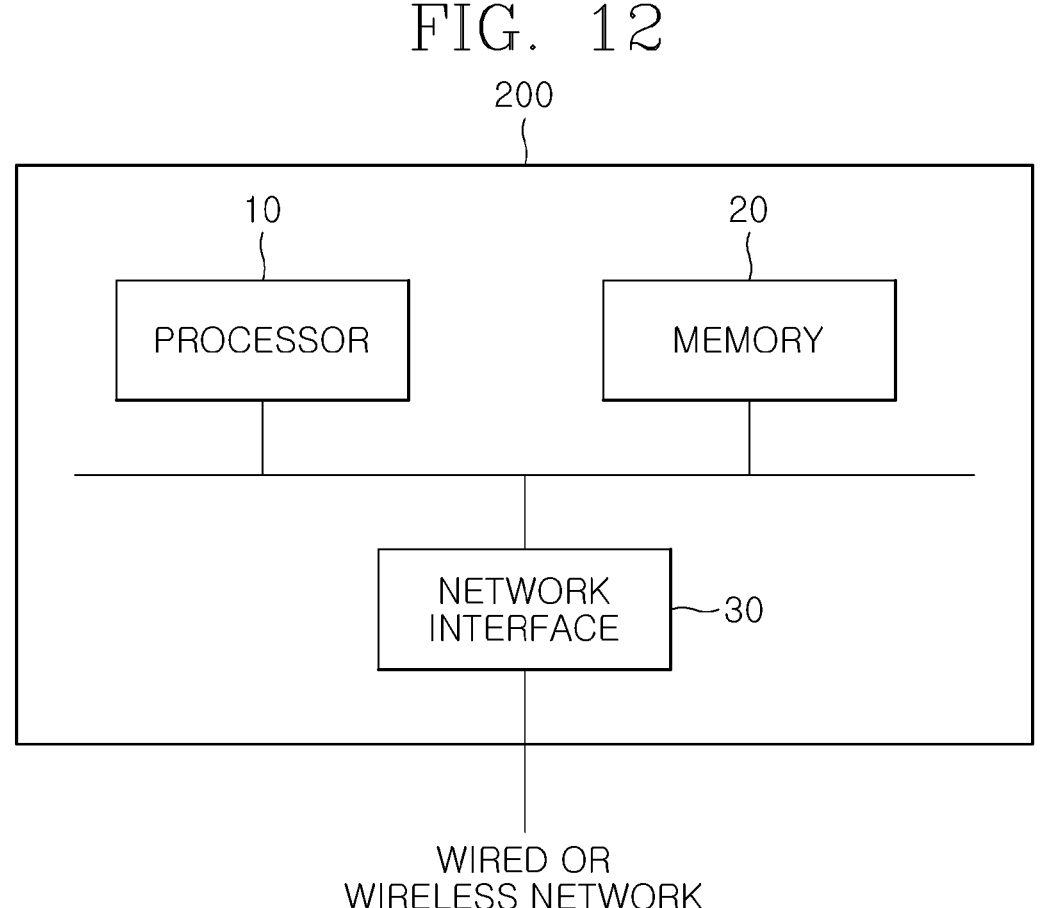
FIG. 12 illustrates detailed components of a fuzzing test device according to an embodiment of the present disclosure.

FIG. 12 illustrates detailed components of device 200 to which a fuzzing test method according to an embodiment of the present disclosure is applicable.

Referring to FIG. 12, the device 200 may be configured to implement a fuzzing test process according to a method proposed by the present disclosure. For example, the device 200 may be a server device 200 configured to perform a fuzzing test with regard to a PUT provided by a terminal 110.

As a more specific example, the device 200 to which a method proposed by the present disclosure is applicable may include a network device such as a repeater, a hub, a bridge, a switch, a router, or a gateway, a computer device such as a desktop computer or a workstation, a mobile device such as a smartphone, a portable device such as a laptop computer, a home appliance such as a digital TV, a transportation means such as a car, and the like. As another example, the device 200 to which the present disclosure is applicable may be included as a part of an application specific integrated circuit (ASIC) implemented on a system-on-chip (SoC) type.

The memory 20 may be operatively connected to the processor 10, may store a program and/or instructions for processing and control of the processor 10, and may store data and information used in the present disclosure, control information necessary to process data and information according to the present disclosure, temporary data occurring in the course of processing data and information, and the like. The memory 20 may be implemented as a storage device such as a read only memory (ROM), a random access memory (RAM), an erasable programmable read only memory (EPROM), an electrically erasable programmable read-only memory (EEPROM), a flash memory, a static RAM (SRAM), a hard disk drive (HDD), or a solid state drive (SSD).

The processor 10 may be operatively connected to the memory 20 and/or a network interface 30, and control operations of respective modules inside the device 200. Particularly, the processor 10 may perform various control functions for performing a method proposed by the present disclosure. The processor 120 may also be referred to as a controller, a microcontroller, a microprocessor, a microcomputer, or the like. A method proposed by the present disclosure may be implemented by hardware, firmware, software, or a combination thereof. When the present disclosure is implemented by using hardware, an application specific integrated circuit (ASIC), a digital signal processor (DSP), a digital signal processing device (DSPD), a programmable logic device (PLD), a field programmable gate array (FPGA), or the like, which is configured to perform the present disclosure, may be provided in the processor 10. Meanwhile, a method proposed by the present disclosure is implemented by using firmware or software, the firmware or software may include instructions related to modules, procedures, functions, or the like, which perform functions or operations necessary to implement a method proposed by the present disclosure. The instructions may be stored in the memory 20 or stored in a computer-readable recording medium (not illustrate) separate from the memory 20 and configured such that, when executed by the processor 10, the device 120 implements a method proposed by the present disclosure.

The device 200 may include a network interface device 30. The network interface device 30 is operatively connected to the processor 10. The processor 10 may control the network interface device 30 so as to transmit or receive information and/or data, signals, wired/wireless signals that carry messages and the like through a wireless/wired network. The network interface device 30 supports various communication specifications such as IEEE 802 series, 3GPP LTE(-A), and 3GPP 5G, for example, and may transmit/receive control information and/or data signals according to the corresponding communication specification. The network interface device 30 may be implemented outside the device 200 if necessary.

Accordingly, a method, a device, a system, and a computer program for a fuzzing test according to an embodiment of the present disclosure can quickly and accurately detect program vulnerabilities by solving the problem in that, in connection with performing coverage-guided fuzzing, program vulnerability detecting performance is degraded after an instrumentation code is removed by a single execution.

In addition, a method, a device, a system, and a computer program for a fuzzing test according to an embodiment of the present disclosure can widely apply a fuzzing test not only to C/C++, but also to various other programming language environments such as Java.

Embodiments described above and the accompanying drawings are only examples, and do not limit the scope of the present disclosure in any manner. In addition, connections of connecting members between components illustrated in the drawings illustrate examples of functional connections and/or physical or circuit-related connections, and may be replaced in actual devices or represented as additional various functional connections, physical connections, or circuit connections. In addition, such components may not be indispensable to application of the present disclosure without specific mentions such as "necessary" and "importantly".

The term "the" and similar indicant terms used in the specification (particularly the claims) of the present disclosure may correspond to both singular and plural forms. A range, when described in the present disclosure, includes the disclosure to which individual values belonging to the range are applied (unless otherwise described), and is the same as when respective individual values constituting the range are described in the detailed description of the present disclosure. Steps presented in method according to the present disclosure are not necessarily intended to be restricted by the order thereof, and the order may be appropriately changed as needed unless a specific step is required to proceed due to the nature of each process. All examples or exemplary terms (for example, and the like) used herein are simply intended to describe the present disclosure in detail, and the scope of the present disclosure is not limited by such examples or exemplary terms unless limited by the claims. In addition, those skilled in the art could understand that various changes, combinations, and modifications can be configured according to design conditions and elements within the appended claims or equivalent scopes thereof.

BRIEF DESCRIPTION OF REFERENCE NUMERALS

10: processor
20: memory
30: interface device
100: fuzzing test system
110: terminal
120: fuzzing test device
130: communication network
200: device The computing apparatuses, the electronic devices, the processors, the memories, the displays, the information output system and hardware, the storage devices, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A method performed by a processor in a device for performing a coverage-guided fuzzing test of a program, the method comprising:

executing, by the processor, the program under test having instrumentation code inserted at respective instrumentation points, while receiving a test input value;

determining, during runtime and based on outputs generated by the instrumentation code, an executed-coverage profile indicating which instrumentation points were executed;

calculating, for each instrumentation point, a dormant-coverage metric indicating one or more instrumentation points that have not been executed within a predefined range of execution counts during a predetermined time interval;

dynamically reconfiguring, by an instrumentation-management unit of the device, an executable instrumentation map stored in memory based on the dormant-coverage metric, including adding or removing instrumentation code at one or more instrumentation points and modifying or disabling instrumentation code associated with the dormant instrumentation points;

executing subsequent fuzzing iterations using the reconfigured instrumentation map so as to reduce runtime monitoring overhead, improve system throughput, and enhance detection efficiency of program vulnerabilities; and updating a record of the executed and dormant instrumentation points to guide generation of mutated test inputs for a next fuzzing cycle.

2. The method of claim 1, further comprising generating one or more mutated input values from a seed input value, wherein a number of the mutated input values is determined based on the dormant-coverage metric, and wherein the test input value comprises one of the mutated input values.

3. The method of claim 2, wherein the number of mutated test input values to be generated is determined based on a ratio of non-dormant coverages, comprising:

subtracting all dormant-coverage metrics accumulated so far from all executed coverages accumulated so far to obtain a first set of non-dormant coverages;

subtracting dormant-coverage metrics related to the seed input value from coverages executed by the seed input value to obtain a second set of non-dormant coverages; and determining the number of mutated input values based on the ratio between the first and second sets.

4. The method of claim 1, wherein the updating comprises, during each of a plurality of predefined time intervals, inserting instrumentation code into the one or more instrumentation points of the program under test based on the dormant-coverage metric determined for the corresponding time interval.

5. The method of claim 4, further comprising calculating the dormant-coverage metric for a current predefined time interval prior to performing the updating for that time interval.

6. The method of claim 5, wherein the updating further comprises, in response to identifying a newly determined dormant-coverage metric, removing instrumentation code from the one or more instrumentation points corresponding to the newly determined dormant-coverage metric.

7. The method of claim 6, wherein the updating further comprises, responsive to determining that all executed-coverages profile accumulated over time are included in all dormant coverages accumulated over time, restoring all instrumentation codes in the program under test, resetting the dormant-coverage history, and increasing the length of the predefined time interval.

8. The method of claim 1, wherein calculating the dormant-coverage metric comprises determining, for each instrumentation point, whether the instrumentation code was executed, and updating a reference execution count for the instrumentation point based on the execution results.

9. The method of claim 1, wherein calculating the dormant-coverage metric comprises, for each predefined time interval, determining a difference between execution counts of each instrumentation point in a preceding time interval and a current time interval, and using the difference as the reference execution count.

10. The method of claim 9, further comprising reducing the reference execution count for each instrumentation point for which the instrumentation code was not executed in the current time interval, and including in the dormant-coverage metric any instrumentation points whose reference execution count falls below a threshold.

11. A method performed by a processor in a device for performing a coverage-guided fuzzing test of a program under test, the method comprising:

executing, by the processor, the program under test having instrumentation code inserted at respective instrumentation points, while receiving a test input value;

determining, during runtime and based on outputs generated by the instrumentation code, an executed-coverage profile indicating which instrumentation points were executed;

calculating, for each instrumentation point, a dormant-coverage metric indicating one or more instrumentation points that have not been executed within a predefined range of execution counts during a predefined time interval; and updating the instrumentation code in the program under test by adding or removing the instrumentation code at one or more points based on the dormant-coverage metric, and dynamically reconfiguring an executable instrumentation map stored in memory based on the dormant-coverage metric, including modifying or disabling instrumentation code associated with the dormant instrumentation points; and executing subsequent fuzzing iterations using the reconfigured instrumentation map so as to reduce runtime monitoring overhead, improve system throughput.

12. The method of claim 11, wherein calculating the dormant-coverage metric comprises updating a reference execution count for each instrumentation point based on whether the instrumentation code was executed in a current time interval.

13. The method of claim 11, wherein calculating the dormant-coverage metric comprises determining, for each instrumentation point, a difference between its execution counts in a preceding time interval and a current time interval and using the difference as the reference execution count.

14. The method of claim 11, further comprising reducing the reference execution count for each instrumentation point not executed in the current time interval and adding to the dormant-coverage metric any instrumentation point whose reference execution count is below a threshold.

15. The method of claim 11, wherein the number of mutated test input values to be generated is determined based on a ratio of non-dormant coverages comprising:

subtracting all dormant-coverage metrics accumulated so far from all executed coverages accumulated so far to obtain a first set of non-dormant coverages;

subtracting dormant-coverage metrics related to the seed input value from executed coverages executed related to the seed input value to obtain a second set of non-dormant coverages; and calculating the ratio between the first and second sets to determine the number of mutated input values.

16. A non-transitory computer-readable storage medium storing instructions which, when executed by a processor, cause a device comprising the processor to perform operations comprising:

executing, by the processor, a coverage-guided fuzzing test by passing test inputs to a program under test having instrumentation code inserted at respective instrumentation points;

determining, during runtime and based on the outputs from the instrumentation code, a set of executed coverage points for each test input;

identifying, for each instrumentation point and during predefined time intervals, one or more dormant-coverage metric representing instrumentation points that have not been executed within a predefined range of execution counts;

updating the instrumentation code in the program under test by adding or removing instrumentation code at one or more instrumentation points based on the identified dormant-coverage metric, and dynamically reconfiguring an executable instrumentation map stored in memory based on the dormant-coverage metric, including modifying or disabling instrumentation code associated with the dormant instrumentation points; and executing subsequent fuzzing iterations using the reconfigured instrumentation map to reduce runtime monitoring overhead and improve system throughput.

\* \* \* \* \*